US009694427B2

(12) United States Patent
Akai et al.

(10) Patent No.: US 9,694,427 B2
(45) Date of Patent: Jul. 4, 2017

(54) MACHINE TOOL

(71) Applicant: DMG MORI SEIKI CO., LTD., Nara (JP)

(72) Inventors: Takayuki Akai, Nara (JP); Yoshihiro Matsumoto, Nara (JP); Masashi Yokoyama, Nara (JP); Toshiaki Tanaka, Nara (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 0 days.

(21) Appl. No.: 14/694,406

(22) Filed: Apr. 23, 2015

(65) Prior Publication Data

US 2015/0306673 A1      Oct. 29, 2015

(30) Foreign Application Priority Data

Apr. 24, 2014   (JP) ................................ 2014-089823

(51) Int. Cl.
| | |
|---|---|
| B23B 3/16 | (2006.01) |
| B23B 29/28 | (2006.01) |
| B23B 3/02 | (2006.01) |
| B23B 3/30 | (2006.01) |
| B23Q 1/76 | (2006.01) |
| B23B 29/24 | (2006.01) |

(52) U.S. Cl.
CPC .............. *B23B 29/287* (2013.01); *B23B 3/02* (2013.01); *B23B 3/161* (2013.01); *B23B 3/30* (2013.01); *B23Q 1/763* (2013.01); *B23B 29/24* (2013.01); *B23B 29/244* (2013.01)

(58) Field of Classification Search
CPC ........ B23Q 1/763; B23Q 1/76; B23B 29/287; B23B 3/161; B23B 3/02; B23B 3/30; B23B 29/24; B23B 29/244; B23B 3/065
USPC .......................................... 82/124, 129, 150
See application file for complete search history.

(56) References Cited

U.S. PATENT DOCUMENTS

| | | | | |
|---|---|---|---|---|
| 41,704 | A | * | 2/1864 | Humfreys ............... B23B 3/161 29/39 |
| 3,750,245 | A | * | 8/1973 | Kennedy ................. B23B 3/161 29/27 R |
| 3,768,527 | A | * | 10/1973 | Messick ............... B23Q 35/102 142/38 |
| 3,821,835 | A | * | 7/1974 | St. Andre ................. B23Q 1/50 29/36 |
| 4,006,518 | A | * | 2/1977 | Rudolph ................. B23B 3/161 29/27 R |

(Continued)

FOREIGN PATENT DOCUMENTS

JP          4741351 B2     8/2011

OTHER PUBLICATIONS

English Abstract and Machine Translation for JP4741351, Publication Date: Aug. 3, 2011.

*Primary Examiner* — Sara Addisu
(74) *Attorney, Agent, or Firm* — IP Business Solutions, LLC (57) ABSTRACT

In a lathe equipped with a spindle for rotatably driving a work and a tool rest having a turret (rotary member) rotatably supporting a plurality of tools in an indexable manner about a horizontal axis, the tool rest is detachably installed on a tool rest installation portion formed so as to be positioned on an operator side so that the tools of the turret face the work side gripped by the spindle in an attachable and detachable manner.

7 Claims, 6 Drawing Sheets

(56) References Cited

U.S. PATENT DOCUMENTS

| | | | | |
|---|---|---|---|---|
| 4,457,193 A * | 7/1984 | Matthey | B23B 3/06 | |
| | | | 29/36 | |
| 4,597,155 A * | 7/1986 | Garnett | B23Q 7/045 | |
| | | | 29/36 | |
| 4,719,676 A * | 1/1988 | Sansone | B23B 3/30 | |
| | | | 29/26 A | |
| 4,785,525 A * | 11/1988 | Ishida | B23B 3/161 | |
| | | | 29/27 R | |
| 5,157,824 A * | 10/1992 | Kojima Hiroshi | B23B 3/06 | |
| | | | 29/27 R | |
| 5,704,262 A * | 1/1998 | Baumbusch | B23B 3/30 | |
| | | | 82/124 | |
| 6,179,692 B1 * | 1/2001 | Hara | B23Q 11/10 | |
| | | | 451/449 | |
| 6,949,056 B2 * | 9/2005 | Soroka | B23K 26/1482 | |
| | | | 29/27 C | |
| 7,913,596 B2 * | 3/2011 | Hirose | B23B 29/16 | |
| | | | 29/27 C | |
| 8,051,543 B2 * | 11/2011 | Arisue | B23B 3/065 | |
| | | | 29/27 C | |
| 8,991,288 B2 * | 3/2015 | Watanabe | B23Q 1/015 | |
| | | | 409/235 | |
| 9,227,245 B2 * | 1/2016 | Tsai | B23B 23/00 | |
| 9,643,256 B2 * | 5/2017 | Akai | B23B 3/161 | |
| 2006/0236514 A1 * | 10/2006 | Sasazawa | B23B 3/065 | |
| | | | 29/27 C | |
| 2008/0066591 A1 * | 3/2008 | Yamane | B23Q 1/0009 | |
| | | | 82/121 | |
| 2010/0268371 A1 * | 10/2010 | Kasuya | B23B 3/30 | |
| | | | 700/114 | |
| 2010/0282037 A1 * | 11/2010 | Fujimoto | B23B 3/30 | |
| | | | 82/121 | |
| 2014/0251097 A1 * | 9/2014 | Walz | B23B 3/168 | |
| | | | 82/121 | |
| 2014/0318331 A1 * | 10/2014 | Walz | B23B 3/165 | |
| | | | 82/120 | |
| 2015/0040732 A1 * | 2/2015 | Ozawa | B23Q 5/045 | |
| | | | 82/121 | |
| 2015/0239081 A1 * | 8/2015 | Niidoi | B23P 23/02 | |
| | | | 451/54 | |
| 2016/0256932 A1 * | 9/2016 | Theurillat | B23B 11/00 | |

* cited by examiner

MACHINE TOOL

CROSS-REFERENCE TO RELATED APPLICATIONS

The present application claims priority under 35 U.S.C. 119 to Japanese Patent Application No. 2014-089823, filed on Apr. 24, 2014, the content of which is incorporated herein by reference in its entirety.

BACKGROUND OF THE INVENTION

Field of the Invention

The present disclosure relates to a machine tool equipped with a spindle for rotatably driving a work and a tool rest having a plurality of edged tools, and more specifically relates to an improvement of the arrangement structure of the spindle and the tool rest capable of easily performing an exchanging operation, etc., of the tool of the tool rest or the entire tool rest.

Description of the Related Art

The following description of related art sets forth the inventors' knowledge of related art and certain problems therein and should not be construed as an admission of knowledge in the prior art.

As a machine tool of this type, conventionally, there exists a small-scale lathe as disclosed by, for example, Japanese patent publication No. 4741351. In this conventional lathe, the spindle is arranged horizontally with the work gripping portion (chuck) facing the operator side, and the tool rest is arranged on an upper side or a lower side of the spindle with the tools facing the operator side. That is, in this conventional lathe, the tool rest is arranged on the same side as the spindle.

However, in the conventional small-scale lathe described in the aforementioned publication, the tool rest is arranged on the spindle side and therefore the tools mounted on the tool rest are arranged at a far position from the operator. Therefore, there are such problems that the exchanging operation of the tools is difficult and that when attaching/detaching the entire tool rest, the attaching/detaching operation is difficult since the spindle disturbs the operation.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The embodiments of the present invention have been made in view of the aforementioned conventional circumstances, and aim to provide a machine tool capable of easily performing an exchanging operation of a tool on a tool rest or an attaching/detaching operation of the entire tool rest.

In some embodiments of the present disclosure, a machine tool is equipped with a spindle for rotatably driving a work and a tool rest having a rotary member supporting a plurality of tools in an indexable manner about a horizontal axis. The tool rest is detachably installed on a tool rest installation portion formed so as to be positioned on an operator side so that the tools on the rotary member face a side of the work gripped by the spindle.

In some embodiments of the present disclosure, in the machine tool as recited above, a linear portion capable of inserting the tool rest from the operator side or above is formed in the tool rest installation portion, and the tool rest is detachably fixed to the linear portion.

In some embodiments of the present disclosure, in the machine tool as recited above, a liner section capable of inserting the tool rest from the operator side is formed at the tool rest installation portion, and the tool rest is detachably fixed to the linear section.

In some embodiments of the present disclosure, in the machine tool as recited any one of the above, the tool rest is attached to or detached from the tool rest installation portion using a carriage movable in a horizontal direction toward the tool rest installation portion.

According to some embodiments as recited above, since the tool rest is installed to the tool rest installation portion positioned on the operator side so that the tools face the work side, the tool is positioned near the operation. Therefore, the exchanging operation of the tool is easy.

Further, since the tool rest is arranged on the operator side, in the case of detaching or attaching the entire tool rest from or to the tool rest installation portion for repairing, exchanging, etc., of the tool rest, the tool rest hardly interferes with the spindle. Therefore, the attaching/detaching operation of the tool rest is easy.

Further, according to some embodiments as recited above, the linear portion capable of inserting the tool rest from the operator side or above into the tool rest installation portion is provided on the operator side. Therefore, in the case of attaching the tool rest to the tool rest installation portion, the installation operation can be performed by simply moving the tool rest toward the linear portion in the horizontal direction or in the vertical direction and fastening and fixing to the linear portion by a fastening member such as a bolt, etc. Further, in the case of detaching the tool rest from the tool rest installation portion, the detaching operation can be performed by simply moving the tool rest outward from the linear portion in the horizontal direction or in the vertical direction. Therefore, the exchanging operation of the tool rest can be easily performed.

According to some embodiments as recited above, the linear section capable of inserting the tool rest from the operator side is formed at the tool rest installation portion. Therefore, in the same manner as in the invention as recited above, the attaching/detaching operation of the tool rest is easy. Further, since the tool rest installation portion is formed as a linear section, as compared to the case of the linear portion, the tool rest supporting rigidity can be improved, which makes it possible to contribute to the improvement of the processing precision.

According to some embodiments as recited above, in the case of attaching the tool rest to the tool rest installation portion, the attaching operation can be performed by simply fixing the tool rest to the carriage, moving the carriage toward the tool rest installation portion, fixing to the linear portion or the linear section with the fastening member, and detaching the fastening member fastening the tool rest to the carriage. Further, in the case of detaching the tool rest from the tool rest installation portion, the detaching operation can be performed by simply fixing the tool rest to the carriage, detaching the fastening member fastening the tool rest to the linear portion or the linear section, and moving the carriage outward from the tool rest installation portion in the horizontal direction. As explained above, since the tool rest is attached to or detached from the tool rest installation portion using the carriage, the attaching/detaching operation of the tool rest can be performed without requiring a large-scale equipment such as a crane.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The disclosed embodiments of the present invention are shown by way of example, and not limitation, in the accompanying figures.

DETAILED DESCRIPTION

In the following paragraphs, some embodiments of the invention will be described by way of example and not limitation. It should be understood based on this disclosure that various other modifications can be made by those in the art based on these illustrated embodiments.

Hereinafter, embodiments of the present invention will be explained based on the attached drawings.

Embodiment 1

FIGS. 1 to 4 are drawings for explaining a horizontal lathe according to Embodiment 1 of the present invention. In this Embodiment, the terms "front" and "back" respectively refer to a closer side and a farther side when seen from an operator M positioned at the front side of the machine, and the terms "left" and "right" respectively refer to the left side and the right side when seen from the operator M.

Figure 1:
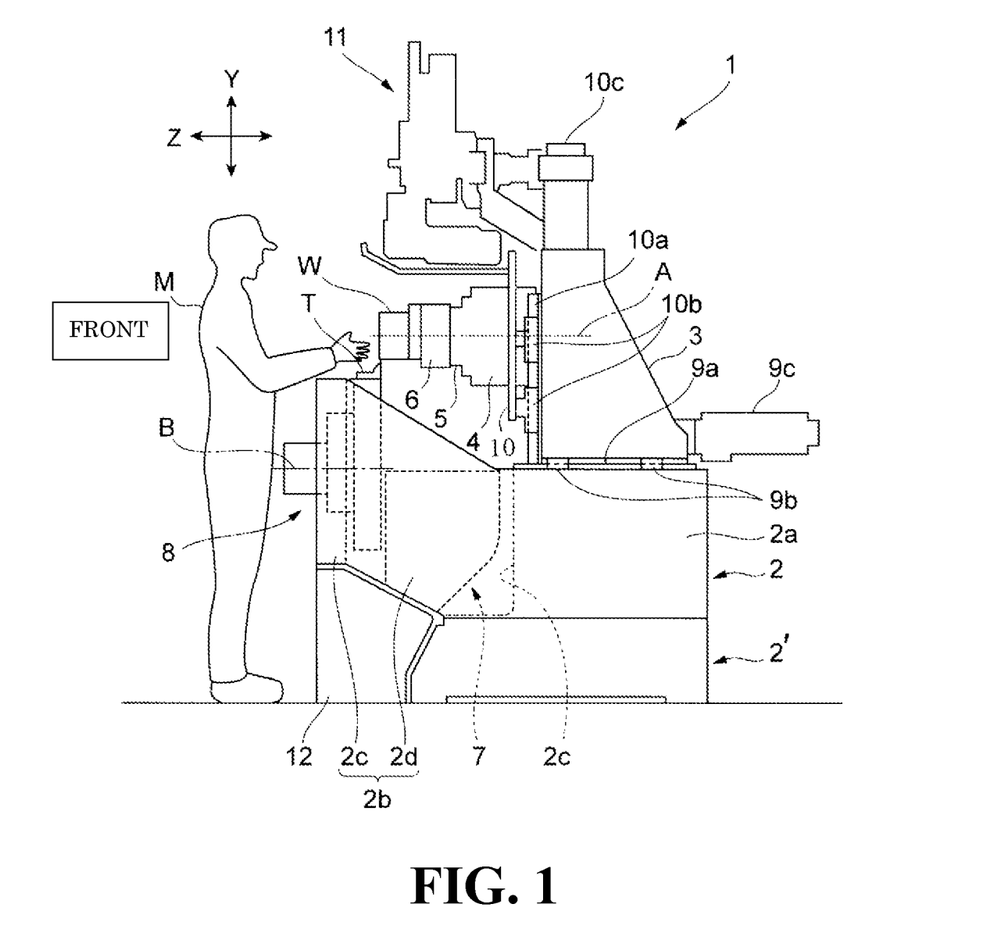
FIG. 1 is a right side view of a horizontal lathe according to Embodiment 1 of the present invention.
Figure 2:
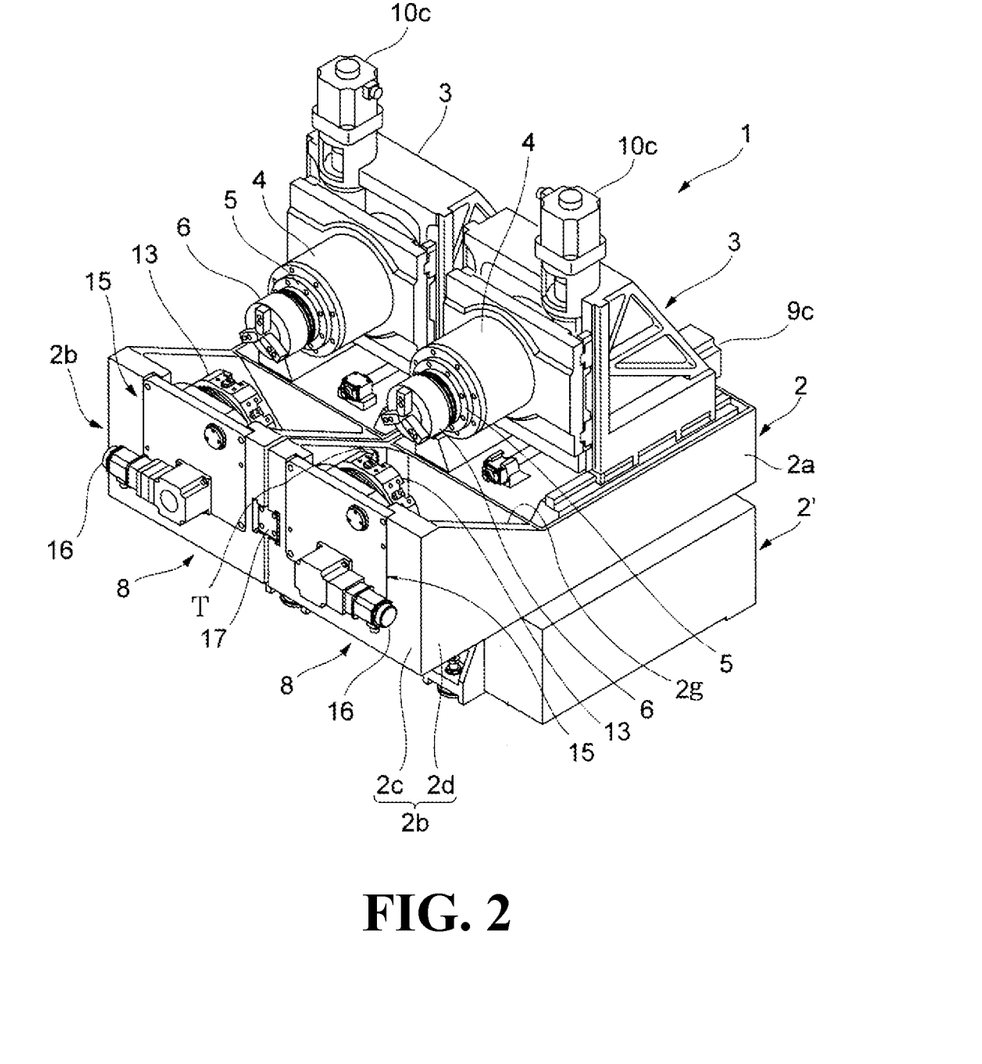
FIG. 2 is a perspective view of the lathe as seen from the front right upper side thereof.

In the drawings, the reference numeral "1" denotes to a front and back opposed-type horizontal lathe. This lathe 1 is equipped with a pair of left and right beds 2 and 2, a column 3 movably arranged on a base section 2a of each bed 2 in the front and back direction (Z-axis direction), a spindle head 4 movably supported on the front face of each column 3 in the up and down direction (Y-axis direction), and a tool rest 8 arranged on the operator M side. The pair of beds 2 and 2 are mounted on a common bed 2'.

Each column 3 is movably mounted on the guide rails 9a fixed to the base section 2a via sliders 9b, and is configured to be movable in the Z-axis direction by rotatably driving a ball screw, which is not illustrated, with a Z-axis feeding motor 9c.

In the same manner, each spindle head 4 is supported by a movable plate 10 movably supported via sliders 10b by guide rails 10a fixed to the front face of the column 3, and is configured to be movable in the Y-axis direction by rotatably driving a ball screw, which is not illustrated, with a Y-axis feeding motor 10c.

In each of the spindle heads 4, a spindle 5 is arranged rotatably with its axis arranged in a horizontal direction. At the tip end part of the spindle 5 protruded from the spindle head 4, a chuck (work gripping portion) 6 for gripping a work W is mounted facing the operator M side. The reference numeral "11" denotes a work import and export mechanism. This mechanism is configured to supply an unprocessed work W to the chuck 6 of the left side spindle 5, supply the processed work by detaching from the chuck 6 to the chuck 6 of the right side spindle 5, and then carry the work W from the chuck 6 to the outside of the machine.

Each bed 2 is equipped with a tool rest installation portion 2b protruded from the base section 2a to the operator M side in an overhung manner, and the left and right tool rest installation portions 2b and 2b are joined each other via a connection bracket 17.

Each tool rest installation portion 2b is equipped with a vertical wall 2c vertically arranged in an open space below the spindle 5 on the operator M side, and left and right side wall 2d and 2d' connecting the vertical wall 2c and the front end portion of the base section 2a. The tool rest installation portion 2b is formed into a rectangular shape in a plan view, and the rectangle shaped part functions as a chip collecting section 2g. Although not illustrated, in the chip collecting section 2g, a chip collecting shooter for guiding chips generated by turning processing of the work W to a lower chip collecting box.

Figure 3:
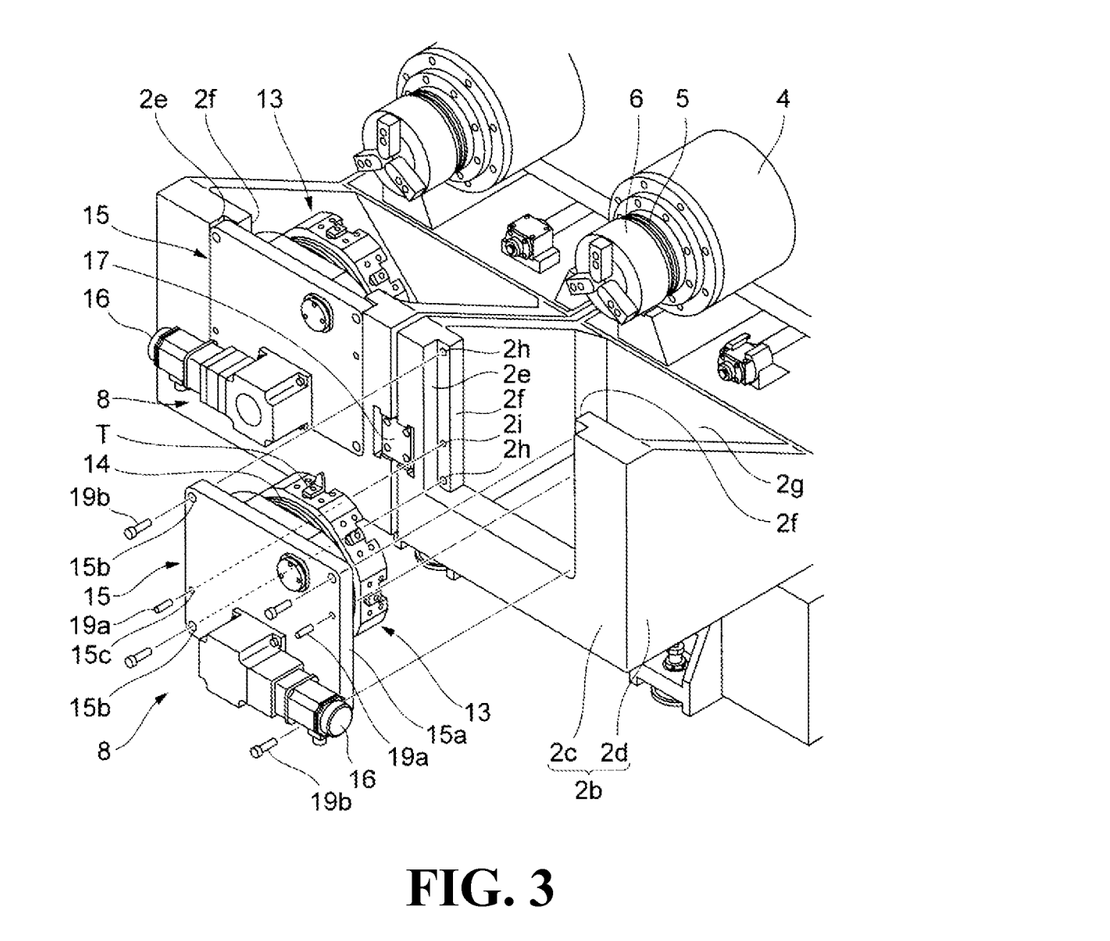
FIG. 3 is a partially exploded perspective view for explaining an assembling operation of a tool rest of the lathe to a tool rest installation portion as seen from the front right upper side thereof as seen from the front right upper side thereof.

In the vertical wall 2c of the tool rest installation portion 2b, a linear portion 2e is formed to detachably attach the tool rest 8. The linear portion 2e is opened upward, and on the vertical side portions thereof, left and right attaching flange parts 2f and 2f are formed so as to form an elongated projection protruded inward of the linear portion 2e. Further, in each of the attaching flange parts 2f and 2f, screw holes 2h and a positioning hole 2i are formed.

The tool rest 8 is provided with a dis-shaped turret (rotary member) 13 equipped with a plurality of edged tools T on the outer peripheral surface thereof, an indexing mechanism 14 rotatably supporting the turret 13 about an axis parallel to an axis of the spindle 5 in an indexable manner, a supporting plate 15 for supporting the indexing mechanism 14, and an indexing motor 16 mounted on the supporting plate 15 for rotatably driving the indexing mechanism 14.

The supporting plate 15 is a rectangular shaped plate and has rectangular shaped attaching flange parts 15a to be engaged with the flange parts 2f. At the portions of the attaching flange parts 15a corresponding to the screw holes 2h and the positioning hole 2i on the linear portion 2e side, bolt holes 15b and a positioning hole 15c are formed in a penetrated manner.

The tool rest 8 is fixed to the vertical wall 2c of the tool rest installation portion 2b by bolts 19b in a state in which positioning pins 19a and 19a preliminary press-fitted in the positioning holes 2i and 2i are aligned with the positioning holes 15c and 15c.

Figure 4:
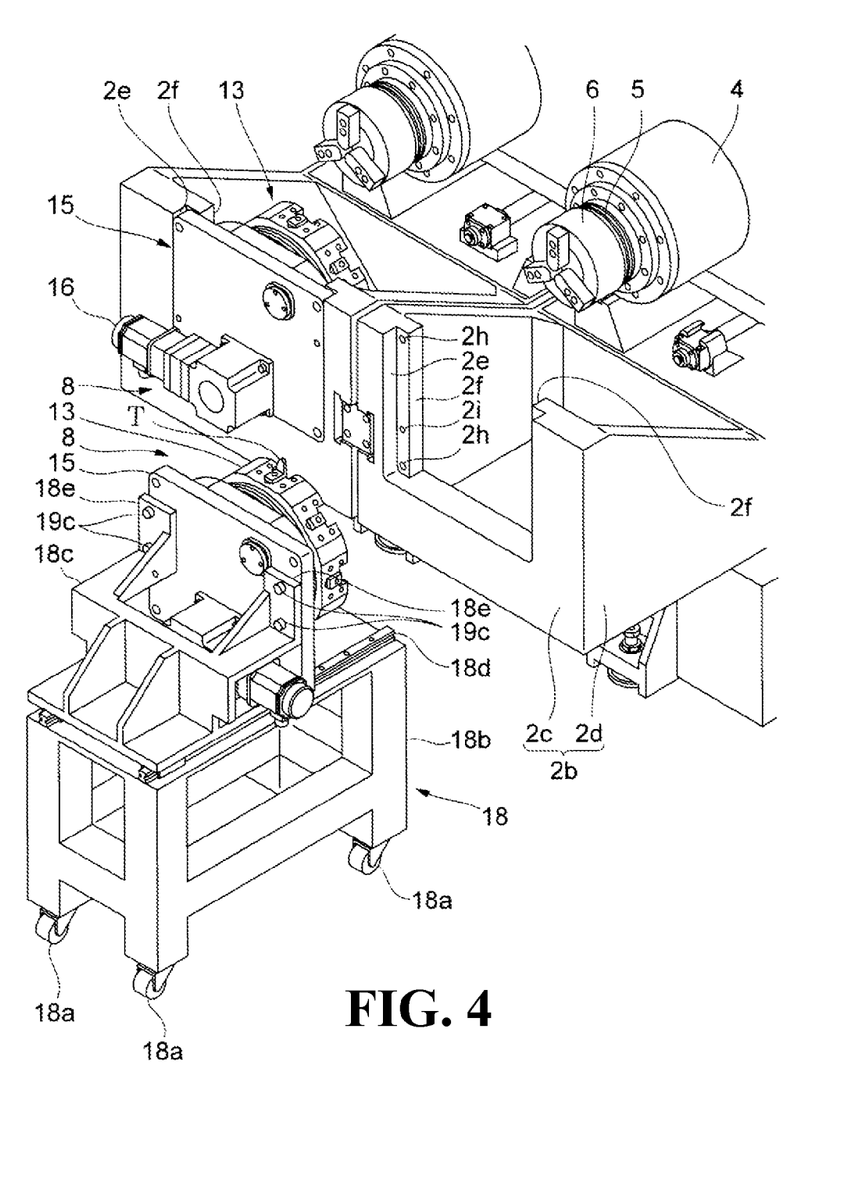
FIG. 4 is a perspective view showing a case in which an assembling operation of a tool rest of the lathe to a tool rest installation portion is performed using a carriage.

The exchange operation of the tool rest 8 is performed using a tool rest exchanging carriage 18 shown in FIG. 4. The carriage 18 is formed into a rectangular parallelepiped shape and equipped with a frame 18b having rollers 18a at the four bottom end corners and a jig 18c mounted on the frame 18b. The jig 18c is mounted on the frame 18b in a slidable manner in the front and back direction by guide rails 18d and 18d fixed on the top face of the frame 18b.

When attaching the tool rest 8 to the vertical wall 2c of the tool rest installation portion 2b, initially, the tool rest 8 is fixed to the supporting section 18e of the jig 18c of the tool rest 8 using bolts 19c. In this state, the carriage 18 is moved to the front of the tool rest installation portion 2b. Then, the jig 18c is slid toward the linear portion 2e, and while aligning the positioning pins 19a implanted to the attaching flange parts 2f and 2f with the positioning holes 15c and 15c of the supporting plate 15, the supporting plate 15 is engaged with the linear portions 2e of the vertical wall 2c. Next, by screwing the bolts 19b into the screw holes 2h of the attaching flange parts 2f and 2f through the bolt holes 15b and 15b of the supporting plate 15, the supporting plate 15, or the tool rest 8, is fixed to the tool rest installation portion 2b. Thereafter, the jig 18c is detached from the supporting plate 15 by pulling out the bolts 19c, and the carriage 18 is moved outward in the horizontal direction.

Further, when detaching the tool rest 8 from the tool rest installation portion 2b, the carriage 18 is moved to the front of the tool rest 8. Then, the supporting section 18e of the jig 18c is brought into contact with the supporting plate 15 of the tool rest 8. In this state, the supporting section 18e is fastened and fixed to the supporting plate 15 with bolts 19c. Next, the bolts 19b fixing the supporting plate 15 to the flange section 2f of the linear portion 2e are pulled out and the carriage 18 is moved outward in the horizontal direction while retreating the jig 18c as it is. Thus, the tool rest 8 is detached from the vertical wall 2c.

According to this Embodiment, since the tool rest 8 is arranged in the tool rest installation portion 2b located on the operator M side so that the tools T face the work W side, or the tools T are positioned on the operator M side, the tools T are positioned near the operator M. Therefore, the exchanging operation of the tools T is easy.

Further, since the tool rest 8 is arranged on the operator M side, in the case of detaching/attaching the entire tool rest 8 from/to the tool rest installation portion 2b for repairing, exchanging, etc., the tool rest 8 hardly interferes with the spindle 5. Therefore, the detaching/attaching operation of the entire tool rest 8 is easy.

Further, the linear portion capable of inserting the tool rest 8 from the operator M side or above is formed in the tool rest installation portion 2b provided at the operator M side. Therefore, in the case of detaching the tool rest 8 from the tool rest installation portion 2b, the detaching operation can be performed by simply pulling out the bolts 19b and moving the tool rest 8 outward from the linear portion 2e in the horizontal direction or in the vertical direction. Further, in the case of attaching the tool rest 8, the attaching operation can be performed by simply moving the tool rest 8 toward the linear portion 2e in the horizontal direction or in the vertical direction and fastening to the linear portion 2e by bolts 19b. Thus, the exchanging operation of the tool rest 8 can be performed easily.

Further, since it is configured that the tool rest 8 is attached/detached using an exchanging carriage 18, the tool rest 8 can be easily attached to or detached from the tool rest installation portion 2b without requiring a large-scale equipment such as a crane.

Further in this Embodiment, since the tool rest 8 is arranged so that the axis of the turret 13 is positioned below the axis of the spindle 5, the rigidity of the tool rest installation potion 2b can be easily secured.

Furthermore, since the tool rest 8 is mounted to the vertical wall 2c of the tool rest installation portion 2b positioned on the operator M side so that the turret 13, or the edged tool T, faces the chuck 6 side of the spindle 5.

Therefore, the spindle 5 and the tool rest 8 are positioned without being displaced in the left and right direction, enabling downsizing of the machine dimension in the left and right direction.

Further, since the tool rest 8 is positioned below the spindle 5 so that the axis of the tool rest 8 is positioned lower than the axis of the spindle 5 utilizing the empty space on the operator M side, the machine dimension in the up and down direction can downsized.

Embodiment 2

Figure 5:
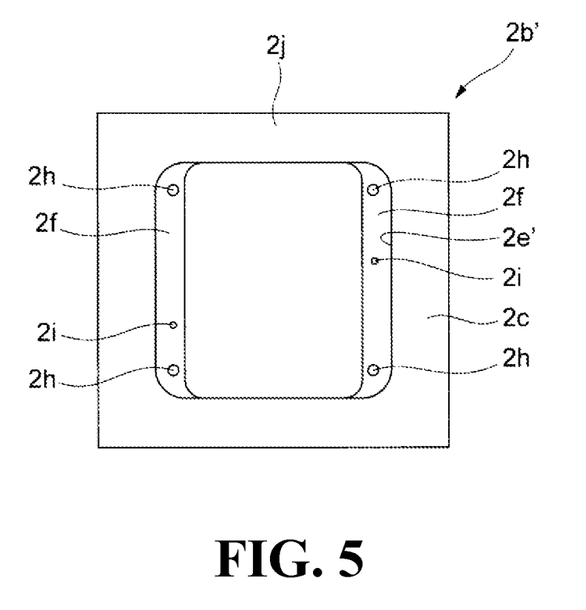
FIG. 5 is a front view of the tool rest installation portion according to Embodiment 2 of the present invention.

In Embodiment 1, the explanation is directed to the case in which the vertical wall 2c of the tool rest installation portion 2b has the linear portion 2e opened upward. However, as shown in FIG. 5, the tool rest installation portion 2b of the present invention can have a linear section 2e' in which the upper edge portions of the linear portions 2e are connected by a beam section 2j.

In the case of providing the linear section 2e' as mentioned above, the same functions and effects as those in Embodiment 1 can be obtained, and further the tool rest supporting rigidity of the tool rest installation portion 2b' can be improved, which makes it possible to contribute to the improvement of the processing precision.

In Embodiments 1 and 2, the explanations are directed to the lathe 1 equipped with two pairs of spindles 5 and tool rests 8 arranged in the left and right direction. However, the machine tool of the present invention can be equipped with one pair or three or more pairs of the spindle 5 and the tool rest 8.

Embodiment 3

Figure 6:
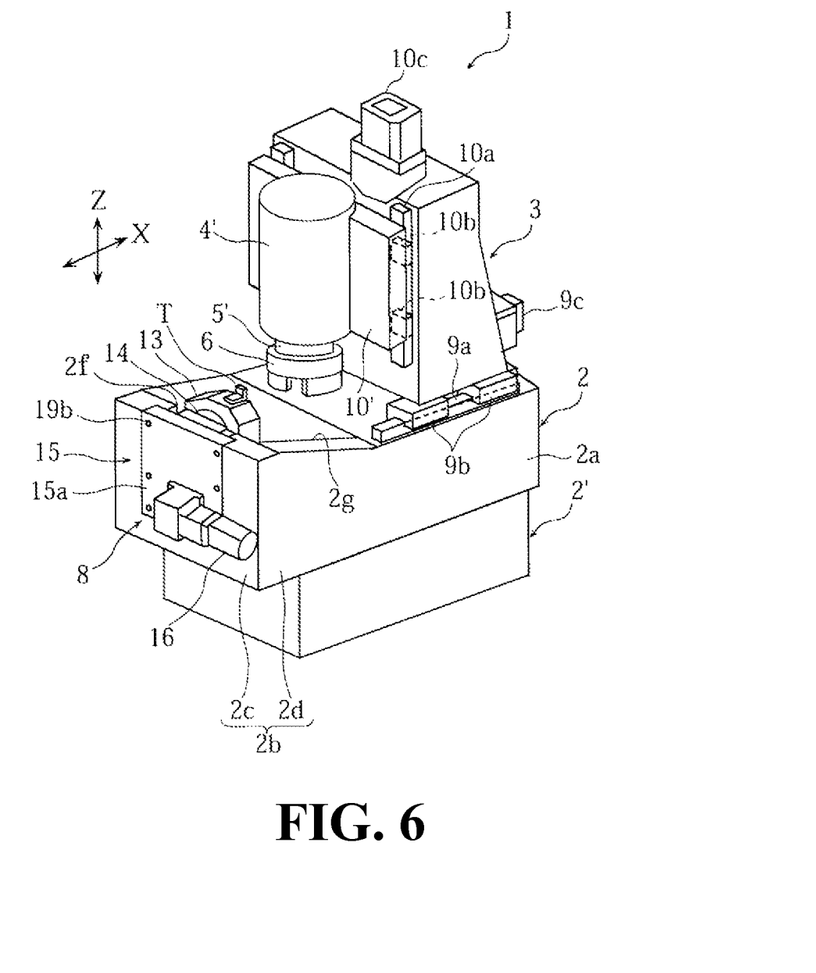
FIG. 6 is a perspective view of a vertical lathe according to Embodiment 3 of the present invention as seen from the right upper side of the lathe.

In Embodiments 1 and 2, the explanations are directed to the case of the horizontal lathe in which the spindle 5 and the tool rest 8 are arranged horizontally. However, the present invention can also applicable to the case of a vertical lathe in which a spindle is arranged vertically. FIG. 6 is a drawing for explaining Embodiment 3. In the drawing, the same reference symbol as in FIGS. 1 and 2 shows the same or corresponding portion.

In Embodiment 3, a spindle head 4' is fixed to a movable plate 10' movably mounted to the front face of the column 3 in the Z-axis (up and down direction). In this spindle 4', the spindle 5' is inserted and arranged in a rotatable manner with the axis arranged in the Z-axis, and a chuck 6' is attached to the lower end of the spindle 5'.

In the tool rest installation portion 2b of this Embodiment 3, a tool rest 8 is detachably attached by the same structure as in Embodiment 1.

Also in Embodiment 3, in the same manner as in Embodiment 1, the functions and results capable of easily performing the exchanging operation of the tool T and/or the attaching/detaching operation of the entire tool rest 8 can be obtained.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A machine tool comprising:
   a bed including a tool rest installation portion and a base section, the tool rest installation portion including a vertical wall and a part;
   a spindle configured on the bed to rotatably drive a work; and
   a tool rest having a rotary member supporting a plurality of tools in an indexable manner about a horizontal axis,
   wherein the tool rest is detachably installed in an opening formed on the vertical wall of the tool rest installation portion formed so as to be positioned on an operator side so that the tools on the rotary member face a side of the work gripped by the spindle,
   one longitudinal end of the part is connected to the vertical wall, and
   the other longitudinal end of the part is connected to the base section, where the one longitudinal end is closer to the tool rest than the other longitudinal end to the tool rest.

2. The machine tool as recited in claim 1,
   wherein the vertical wall includes first, second, and third linear portions which define the opening,
   wherein the tool rest is inserted from the operator side or above, and
   wherein the tool rest is detachably fixed to a flange part of the linear portions.

3. The machine tool as recited in claim 2, wherein the tool rest is attached to or detached from the tool rest installation portion using a carriage movable in a horizontal direction toward the tool rest installation portion.

4. The machine tool as recited in claim 1,
wherein the vertical wall includes first, second, and third linear portions which define the opening,
wherein the tool rest is inserted to the opening from the operator side, and
wherein the tool rest is detachably fixed to a flange part of the linear portions.

5. The machine tool as recited in claim 4, wherein
the tool rest is attached to or detached from the tool rest installation portion using a carriage movable in a horizontal direction toward the tool rest installation portion.

6. The machine tool as recited in claim 1, wherein
when the tool rest is attached, the plurality of tools are arranged between the spindle and the vertical wall in a first direction perpendicular to the horizontal direction.

7. The machine tool as recited in claim 6, wherein
the tool rest is detachable in the first direction towards the operator side.

* * * * *